US010782797B2

(12) United States Patent
Chu et al.

(10) Patent No.: US 10,782,797 B2
(45) Date of Patent: Sep. 22, 2020

(54) MOUSE DEVICE

(71) Applicant: Primax Electronics Ltd., Taipei (TW)

(72) Inventors: Chun-Lin Chu, Taipei (TW);
Chun-Che Wu, Taipei (TW)

(73) Assignee: PRIMAX ELECTRONICS LTD,
Taipei (TW)

( * ) Notice: Subject to any disclaimer, the term of this patent is extended or adjusted under 35 U.S.C. 154(b) by 49 days.

(21) Appl. No.: 16/200,819

(22) Filed: Nov. 27, 2018

(65) Prior Publication Data

US 2020/0081558 A1   Mar. 12, 2020

(30) Foreign Application Priority Data

Sep. 7, 2018  (TW) .............................. 107131550 A

(51) Int. Cl.
*G06F 3/0354*   (2013.01)
(52) U.S. Cl.
CPC ................................ *G06F 3/03543* (2013.01)
(58) Field of Classification Search
CPC .................................................... G06F 3/03543
USPC .................................................... 345/1.1, 163
See application file for complete search history.

(56) References Cited

U.S. PATENT DOCUMENTS

| 7,007,246 | B2* | 2/2006 | Yamaguchi | G06F 1/1616 |
| | | | | 345/1.1 |
| 2005/0099393 | A1* | 5/2005 | Johnson | G06F 3/03543 |
| | | | | 345/163 |
| 2011/0279371 | A1* | 11/2011 | Ma | G06F 3/03543 |
| | | | | 345/163 |
| 2011/0303043 | A1* | 12/2011 | Tang | H01H 13/20 |
| | | | | 74/491 |
| 2018/0275776 | A1* | 9/2018 | Li | G06F 3/0362 |
| 2019/0220107 | A1* | 7/2019 | Odgers | G01L 5/22 |

* cited by examiner

*Primary Examiner* — Prabodh M Dharia
(74) *Attorney, Agent, or Firm* — Kirton McConkie; Evan R. Witt

(57) ABSTRACT

A mouse device includes a button, a switch, a linkage element, a plate body, a supporting element and an adjusting element. A triggering part of the plate body is arranged between the linkage element and the switch. When the adjusting element is moved, the supporting element is correspondingly moved. Consequently, the supporting element is selectively contacted with the first fulcrum or the second fulcrum. While the button is pressed down and the linkage element is moved downwardly toward the triggering part, the triggering part is swung around a first fulcrum or a second fulcrum of the plate body to push the switch. Consequently, the switch is triggered.

9 Claims, 7 Drawing Sheets

MOUSE DEVICE

FIELD OF THE INVENTION

The present invention relates to an input device, and more particularly to a mouse device.

BACKGROUND OF THE INVENTION

The widely-used input devices include for example mouse devices, keyboard devices or trackballs. As known, mouse devices are prevailing because they are very easy-to-use. When a mouse device is held by a user's palm, the user may move the mouse device to control movement of the cursor shown on the computer screen. In addition, by manipulating the buttons of the mouse device with the user's fingers, the user may click and select a desired icon shown on the computer screen or execute a corresponding function. As a consequence, most users and most manufacturers of the input devices pay much attention to the keyboard devices.

In the existing mouse device, the click force for pressing down the button is usually a fixed click force that is designed by the designer. For pressing down the button of the mouse device, the pressing force exerted by the user has to be greater than the fixed click force. Generally, in the conventional mouse device, the magnitude of the click force for pressing down the button cannot be adjusted according to the preferences or habits of the users. As the applications of the electronic products are gradually increased, the user groups of the electronic products become more diverse. For example, elderly people and children also have become important user groups of the mouse devices.

Generally, the strengths of elderly people, children and women are lower than the strengths of men. The excessive use of the mouse device and the frequent pressing operation on the button of the mouse device may cause wrist pain. For a child in the growing period, the wrist pain undoubtedly influences the growth and development of the body. For a heavy player of a computer game, the long-term use of a greater force to press the button of the mouse device also has a wrist pain problem. For a white-collar worker, he (or she) also has the need to adjust the click force of the mouse device according to the personal habit.

In order to solve the above problems, a mouse structure with an adjustable click force function is disclosed in Taiwanese Patent No. TWI430140 for example. The click force of the mouse device is adjustable according to the user's preference. However, this technology still has some drawbacks. Firstly, the triggering switch is not arranged along the force-exerting direction of the button. That is, the position of the button to be clicked by the user and the position of the triggering switch are not arranged along the vertical direction. As the distance between the click position of the button and the triggering switch is increased, the empty travel distance of the button is increased and thus the tactile feel of clicking the button is impaired. Secondly, while the user adjusts the click force through the adjusting mechanism, the triggering switch is correspondingly moved back and forth. According to the specifications of the general mouse device, the number of times the button is pressed down must reach several millions. The movement of the triggering switch may adversely affect the stability of the triggering switch and obviously decrease the reliability of the triggering switch. Moreover, as the triggering switch is moved, the cable between the triggering switch and the circuit board is readily detached.

In other words, the conventional mouse device needs to be further improved.

SUMMARY OF THE INVENTION

The present invention relates to a mouse device, and more particularly to a mouse device with an adjustable click force function so as to meet the operating requirements of different users.

In accordance with an aspect of the present invention, there is provided a mouse device. The mouse device includes a button, a switch, a linkage element, a plate body, a supporting element, an adjusting element and a casing. The linkage element is located under the button and linked with the button. The plate body includes a first fulcrum, a second fulcrum and a triggering part. The triggering part is arranged between the linkage element and the switch. There is a first spacing distance between the triggering part and the first fulcrum. There is a second spacing distance between the triggering part and the second fulcrum. The supporting element is located under the plate body to support the plate body. When the adjusting element is moved, the supporting element is correspondingly moved, so that the supporting element is contacted with the first fulcrum or the supporting element is contacted with the second fulcrum. The switch, the plate body and the supporting element are accommodated within the casing. While the button is pressed down and the linkage element is moved downwardly toward the triggering part, the triggering part is swung around the first fulcrum or the second fulcrum to push the switch, so that the switch is triggered.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
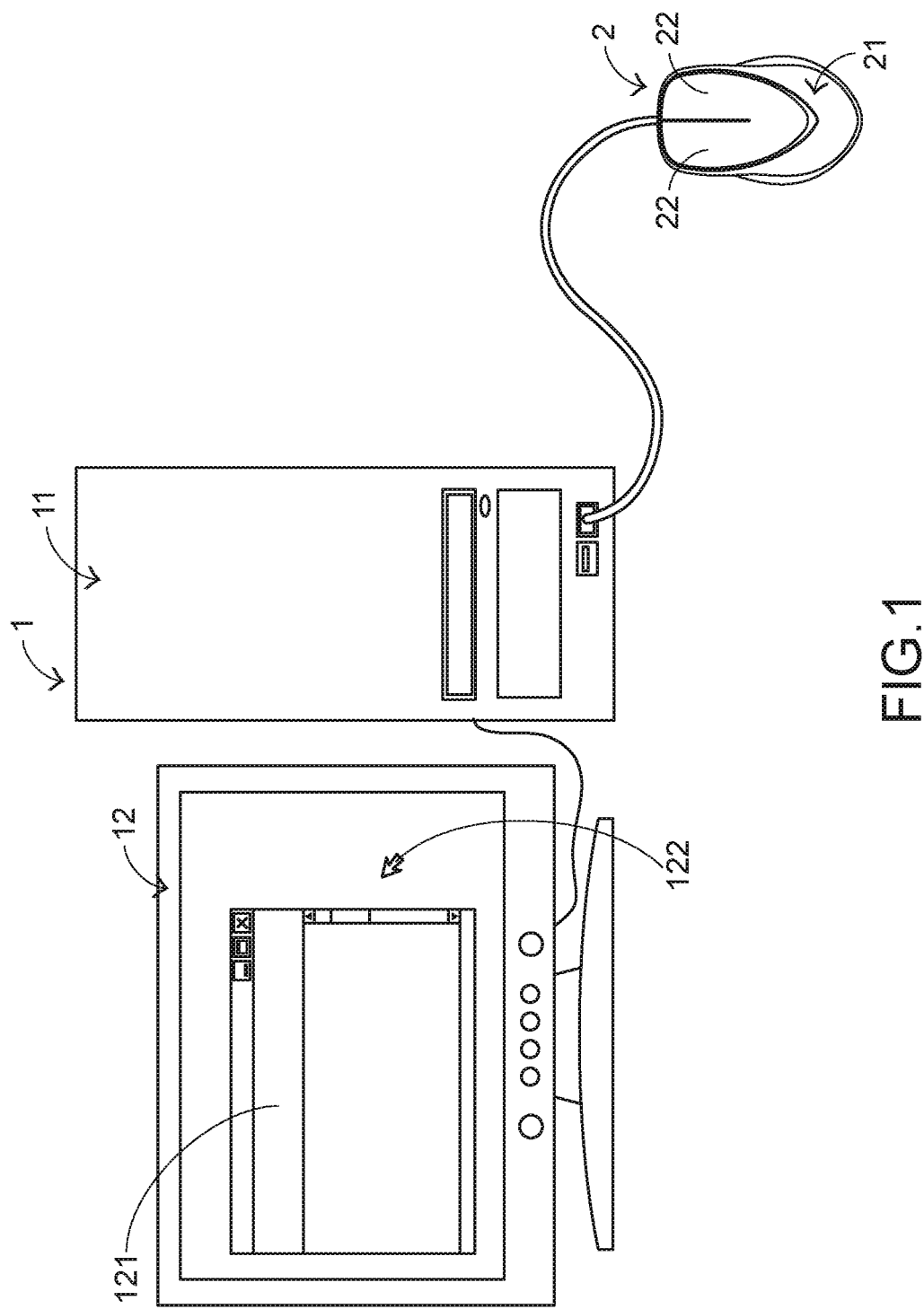
FIG. 1 schematically illustrates the connection between a mouse device and a computing device according to an embodiment of the present invention.

FIG. 1 schematically illustrates the connection between a mouse device and a computing device according to an embodiment of the present invention. As shown in FIG. 1, the computing device 1 comprises a computer host 11 and a computer screen 12. The computer host 11 is in communication with the mouse device 2 and the computer screen 12. In this embodiment, the computer host 11 is in communication with the mouse device 2 and the computer screen 12 in a wired transmission manner. Alternatively, the computer host is in communication with the mouse device and the computer screen in a wireless transmission manner. A cursor 122 and a graphic-based window 121 are displayed on the computer screen 12. When the user's palm holds the mouse device 2 to move the mouse device 2, the cursor 122 shown on the computer screen 12 is correspondingly moved by the computer host 11 according to the displacement amount of the mouse device 2. The implementation examples and principles of operating the mouse device 2 to control the cursor 2 on the computer screen 12 are well known to those skilled in the art, and are not redundantly described herein.

Figure 2:
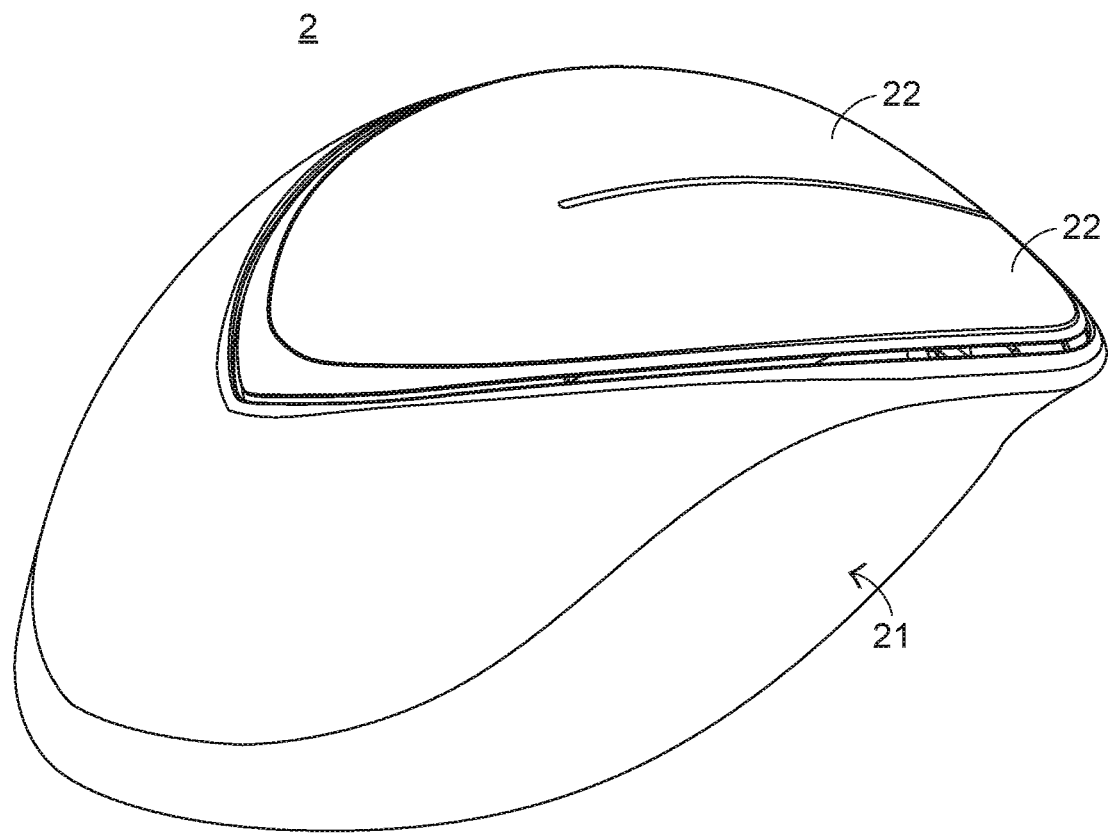
FIG. 2 is a schematic perspective view illustrating the outer appearance of s mouse device according to an embodiment of the present invention.
Figure 3:
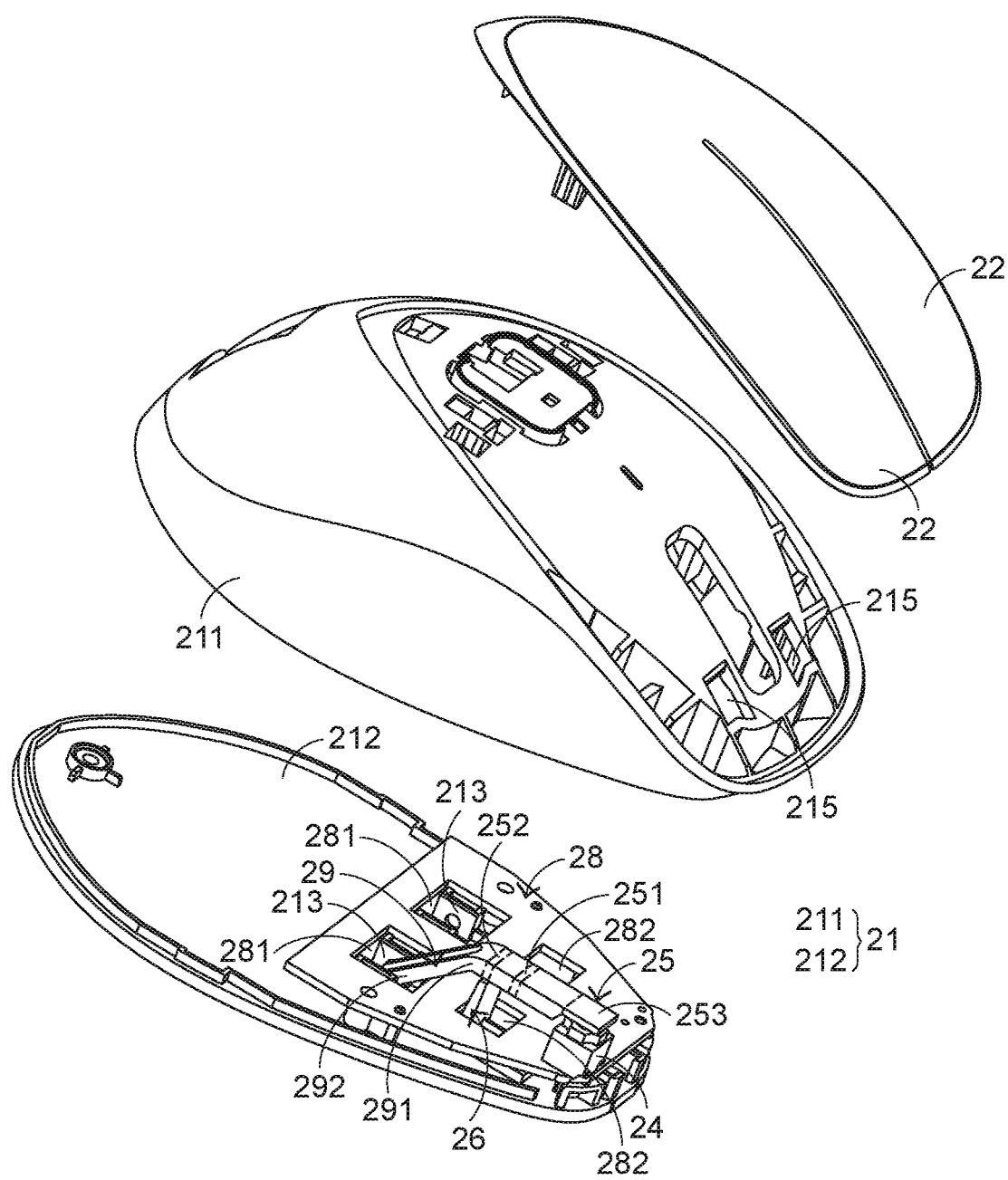
FIG. 3 is a schematic exploded view illustrating a portion of the mouse device as shown in FIG. 2.
Figure 4:
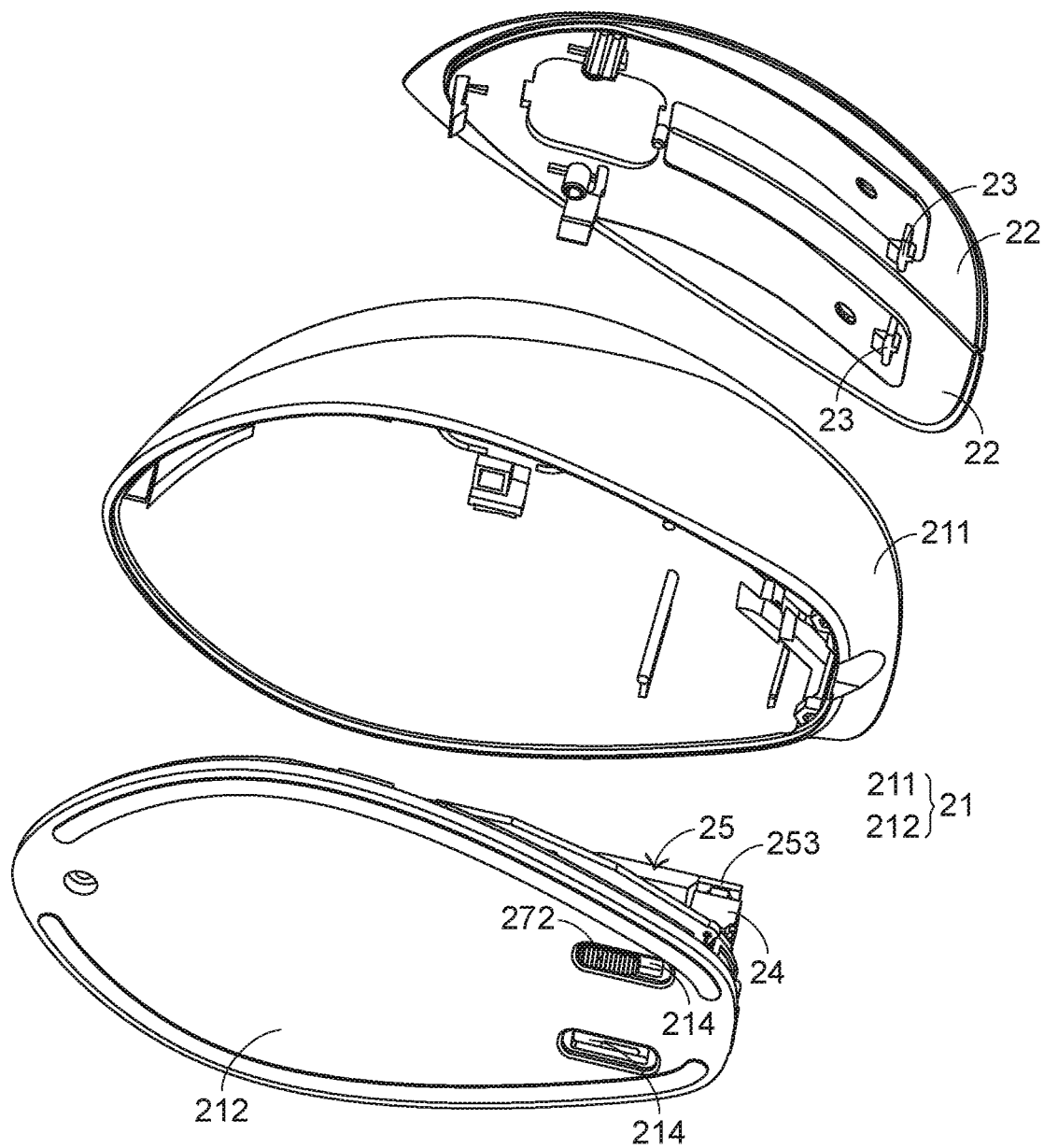
FIG. 4 is a schematic exploded view illustrating a portion of the mouse device as shown in FIG. 3 and taken along another viewpoint.
Figure 5:
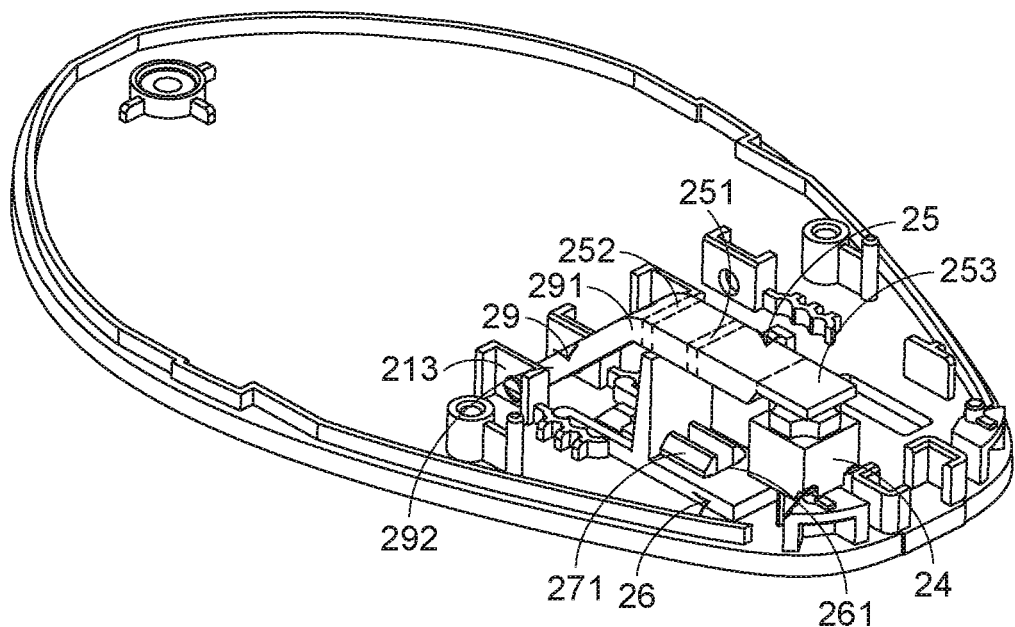
FIG. 5 is a schematic perspective view illustrating the base, the switch, the plate body, the supporting element and the adjusting element of the mouse device as shown in FIG. 2.
Figure 6:
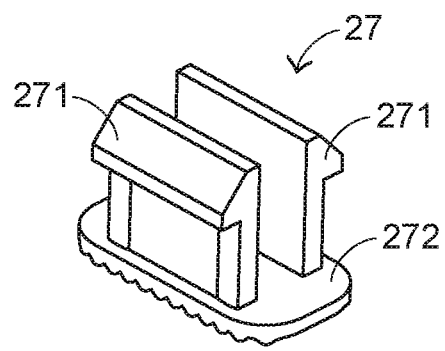
FIG. 6 is schematic perspective view illustrating the adjusting element of the mouse device as shown in FIG. 2.

Please refer to FIGS. 2, 3, 4, 5 and 6. FIG. 2 is a schematic perspective view illustrating the outer appearance of s mouse device according to an embodiment of the present invention. FIG. 3 is a schematic exploded view illustrating a portion of the mouse device as shown in FIG. 2. FIG. 4 is a schematic exploded view illustrating a portion of the mouse device as shown in FIG. 3 and taken along another viewpoint. FIG. 5 is a schematic perspective view illustrating the base, the switch, the plate body, the supporting element and the adjusting element of the mouse device as shown in FIG. 2. FIG. 6 is schematic perspective view illustrating the adjusting element of the mouse device as shown in FIG. 2. For succinctness, only one linkage element 23, one switch 24, one plate body 25, one supporting element 26 and one adjusting element 27 are shown in FIGS. 2, 3, 4 and 5.

In an embodiment, the mouse device 2 comprises a casing 21, plural buttons 22, plural linkage elements 23, plural switches 24, plural plate bodies 25, plural supporting elements 26, plural adjusting elements 27 and a circuit board 28. The plural switches 24 are electrically connected with the circuit board 28. Each button 22 corresponds to one linkage element 23, one switch 24, one plate body 25, one supporting element 26 and one adjusting element 27. The casing 21 comprises a top cover 211 and a base 212. The top cover 211 and the base 212 are combined together. The plural switches 24, the plural plate bodies 25, the plural supporting elements 26 and the circuit board 28 are accommodated within an accommodation space between the top cover 211 and the base 212. These buttons 22 are exposed outside the top cover 211 of the casing 21. Consequently, the buttons 22 can be operated and pressed by the user. When one of the buttons 22 is pressed down, the corresponding switch 24 is triggered. Consequently, the circuit board 28, which is electrically connected with the switch 24, generates a button signal. The button signal is transmitted to the computing device 1, which is in communication with the mouse device 2. According to the button signal, the computing device 1 executes a corresponding command or function.

Each linkage element 23 is located under the corresponding button 22 and linked with the corresponding button 22. Each plate body 25 comprises a first fulcrum 251, a second fulcrum 252 and a triggering part 253. The triggering part 253 is arranged between the corresponding linkage element 23 and the corresponding switch 24. There is a first spacing distance D1 between the triggering part 253 and the first fulcrum 251 (see FIG. 7). There is a second spacing distance D2 between the triggering part 253 and the second fulcrum 252 (see FIG. 7). The second spacing distance D2 is larger than the first spacing distance D1. Each supporting element 26 is located under the corresponding plate body 25 to support the corresponding plate body 25. Each adjusting element 27 is partially exposed outside the casing 21 so as to be operated by the user. As the adjusting element 27 is operated by the user and the supporting element 26 is correspondingly moved, the supporting element 26 is contacted with the first fulcrum 251 of the corresponding plate body 25 or contacted with the second fulcrum 252 of the corresponding plate body 25. Consequently, the click force of the corresponding button 22 is adjusted. The operating principle of adjusting the click force will be described later.

In this embodiment, the mouse device 2 further comprises plural extension parts 29 corresponding to the plural plate bodies 25. Each extension part 29 has a first end 291 and a second end 292. The first end 291 of the extension part 29 is connected with the corresponding plate body 25. The second end 292 of the extension part 29 is extended in the direction away from the triggering part 253 of the plate body 25. The first fulcrum 251 and the second fulcrum 252 of the plate body 25 are arranged between the triggering part 253 and the extension part 29. Preferably but not exclusively, each extension part 29 is integrally formed with the corresponding plate body 25. The casing 21 further comprises plural connecting parts 213. Each connecting part 213 is connected with the base 212 and protruded upwardly from the base 212. Moreover, the second end 292 of the extension part 29 is pivotally coupled to the corresponding connecting part 213.

In this embodiment, each supporting element 26 comprises an opening 261. Moreover, a first end of each adjusting element 27 has a protrusion structure 271. After the protrusion structure 271 of the adjusting element 27 is penetrated through the opening 261 of the corresponding supporting element 26, the adjusting element 27 is engaged with the corresponding supporting element 26. Consequently, when one of the adjusting elements 27 is moved, the corresponding supporting element 26 is moved with the adjusting element 27. In an embodiment, the casing 21 further comprises plural sliding grooves 214 corresponding to the plural adjusting elements 27. The sliding grooves 214 are exposed outside the base 212 of the casing 21. A second end 272 of the adjusting element 27 is inserted into the corresponding sliding groove 214. Consequently, the second end 272 of the adjusting element 27 is movable within the corresponding sliding groove 214. While the second end 272 of the adjusting element 27 is moved within the corresponding sliding groove 214, the corresponding supporting element 26 is moved with the adjusting element 27.

In an embodiment, the casing 21 further comprises plural apertures 215 corresponding to the plural linkage elements 23. A first end of each linkage element 23 is connected with the corresponding button 22. A second end of the corresponding linkage element 23 is extended in the direction toward the switch 24, penetrated through the corresponding aperture 215, and contacted with the triggering part 253 of the corresponding plate body 25. The switches 24 are fixed on the circuit board 28. Each switch 24 is aligned with the triggering part 253 of the corresponding plate body 25 and the corresponding linkage element 23 along the nearly vertical direction.

In an embodiment, the circuit board 28 comprises plural first board holes 281 corresponding to the plural extension parts 29 and plural second board holes 282 corresponding to the plural supporting element 26. The second end of the extension part 29 is penetrated through the corresponding first board hole 281 and pivotally coupled to the connecting part 213 of the casing 21. The supporting elements 26 are penetrated through the corresponding second board holes 282. While the supporting element 26 is moved with the corresponding adjusting element 27, the supporting element 26 is moved within the corresponding second board hole 282.

Figure 7:
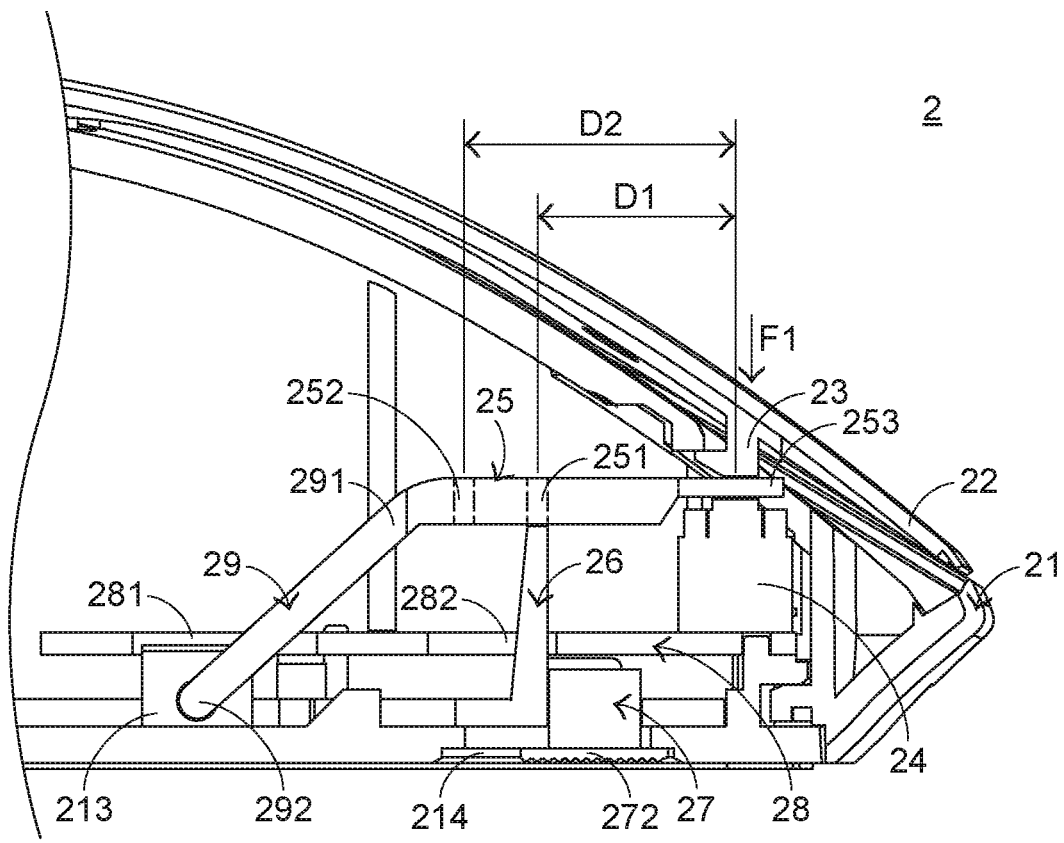
FIG. 7 is a schematic cross-sectional view illustrating the mouse device as shown in FIG. 2, in which the supporting element is contacted with the first fulcrum of the plate body.
Figure 8:
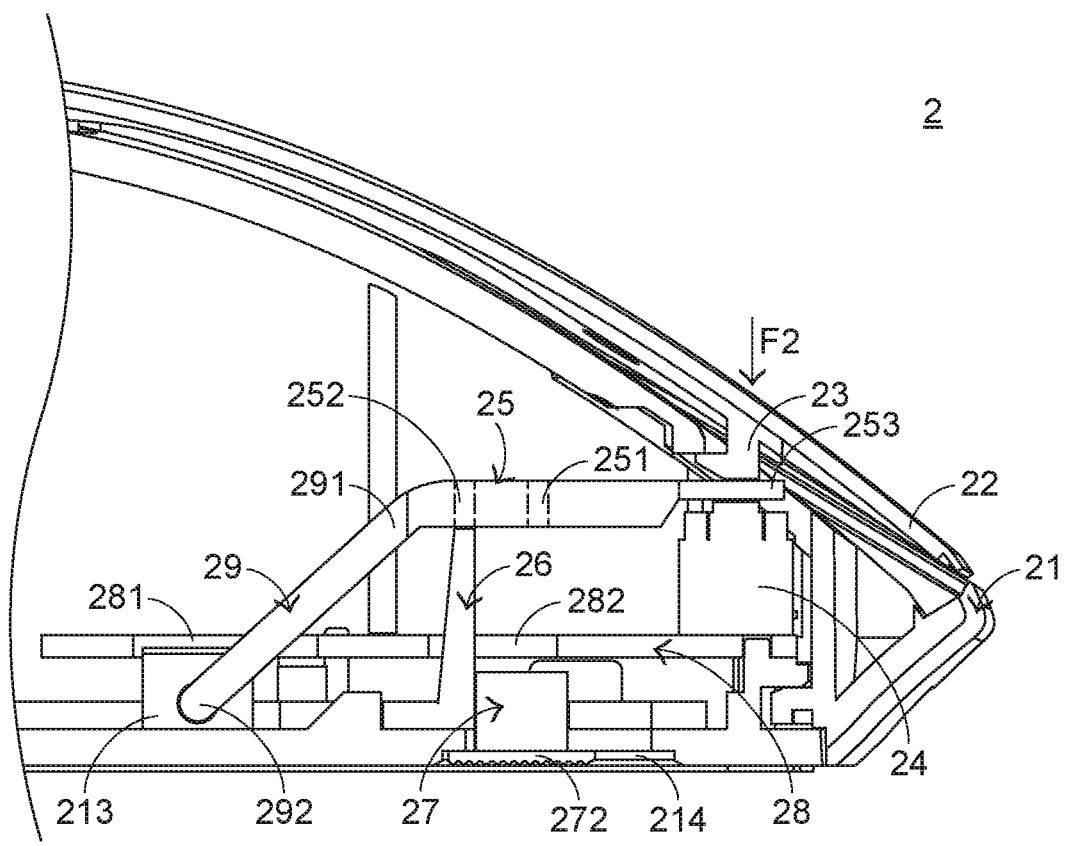
FIG. 8 is a schematic cross-sectional view illustrating the mouse device as shown in FIG. 2, in which the supporting element is contacted with the second fulcrum of the plate body.

Hereinafter, an example of adjusting the click force of the button 22 of the mouse device 2 will be illustrated with reference to FIGS. 7 and 8. FIG. 7 is a schematic cross-sectional view illustrating the mouse device as shown in FIG. 2, in which the supporting element is contacted with the first fulcrum of the plate body. FIG. 8 is a schematic cross-sectional view illustrating the mouse device as shown in FIG. 2, in which the supporting element is contacted with the second fulcrum of the plate body.

Please refer to FIG. 7. The supporting element 26 is contacted with the first fulcrum 251 of the plate body 25. As mentioned above, the linkage element 23 is linked with the corresponding button 22. While the button 22 is pressed down, the linkage element 23 is correspondingly moved downwardly toward the triggering part 253 of the plate body 25. Consequently, the triggering part 253 of the plate body 25 is rotated around the first fulcrum 251 of the plate body 25 and swung toward the switch 24, and the extension part 29 is pivotally coupled to the connecting part 213 of the casing 21. When the switch 24 is pushed by the triggering part 253 of the plate body 25, the switch 24 is triggered. As shown in FIG. 7, the switch 24 is triggered when the force exerted by the user is at least equal to a first click force F1.

Please refer to FIG. 8. The supporting element 26 is contacted with the second fulcrum 252 of the plate body 25. While the button 22 is pressed down, the linkage element 23 is correspondingly moved downwardly toward the triggering part 253 of the plate body 25. Consequently, the triggering part 253 of the plate body 25 is rotated around the second fulcrum 255 of the plate body 25 and swung toward the switch 24, and the extension part 29 is pivotally coupled to the connecting part 213 of the casing 21. When the switch 24 is pushed by the triggering part 253 of the plate body 25, the switch 24 is triggered. As shown in FIG. 8, the switch 24 is triggered when the force exerted by the user is at least equal to a second click force F2.

As mentioned above, the second spacing distance D2 between the second fulcrum 252 and the triggering part 253 of the plate body 25 is larger than the first spacing distance D1 between the first fulcrum 251 and the triggering part 253 of the plate body 25. According to the principle of leverage, the second click force F2 is smaller than the first click force F1. In FIG. 7, the supporting element 26 is contacted with the first fulcrum 251 of the plate body 25. In FIG. 8, the supporting element 26 is contacted with the second fulcrum 252 of the plate body 25. Consequently, the click force for clicking the switch 24 in the situation of FIG. 8 is smaller than the click force for clicking the switch 24 in the situation of FIG. 7. According to the design of the present mouse device 2, the user may move the adjusting element 27 to adjust the position of the supporting element 26. Consequently, the supporting element 26 is selectively contacted with the first fulcrum 251 of the plate body 25 or the second fulcrum 252 of the plate body 25 according to the practical requirements. That is, by moving the supporting element 26, the situation of FIG. 7 is switched to the situation of FIG. 8 or the situation of FIG. 8 is switched to the situation of FIG. 7. Consequently, the purpose of adjusting the click force of the button 22 is achieved.

In accordance with the feature of the present invention, each switch 24 of the mouse device 2 is aligned with the triggering part 253 of the corresponding plate body 25 and the corresponding linkage element 23 along the nearly vertical direction. Consequently, the empty travel distance of pressing down the button 22 is decreased. That is, the distance from the state of pressing the button to the state of triggering the switch 24 is decreased. As a consequence, the tactile feel of the user to click the button 22 is enhanced. Moreover, the switch 24 of the mouse device 2 is fixed on the circuit board 28. Consequently, while the user moves the adjusting element 27 to adjust the click force of the button 22, the switch 24 is not moved. This design can increase the stability and use reliability of the button 22. Moreover, the cable between the switch 24 and the circuit board 28 will not be detached.

It is noted that numerous modifications and alterations may be made while retaining the teachings of the invention. In the above embodiment, the extension parts 29 are pivotally coupled to the casing 21. Alternatively, in another embodiment, the extension parts 29 are fixedly coupled to the casing 21. While the button 22 is pressed down, the triggering part 253 of the plate body 25 is rotated around the first fulcrum 251 or the second fulcrum 252 of the plate body 25. Under this circumstance, the triggering part 253 of the plate body 25 is swung like a cantilever beam. In the above embodiment, the sliding grooves 214 and portions of the adjusting elements 27 are exposed outside the base 212 of the casing 21. Alternatively, in another embodiment, the sliding grooves 214 and portions of the adjusting elements 27 are exposed outside other regions of the casing 21. In the above embodiment, each adjusting element 27 and the corresponding supporting element 26 are connected with each other through an engaging means. Alternatively, in another embodiment, the each adjusting element 27 and the corresponding supporting element 26 are connected and linked with each other through any other appropriate coupling means.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
   a button;
   a switch;
   a linkage element located under the button and linked with the button;
   a plate body comprising a first fulcrum, a second fulcrum and a triggering part, wherein the triggering part is arranged between the linkage element and the switch, there is a first spacing distance between the triggering part and the first fulcrum, and there is a second spacing distance between the triggering part and the second fulcrum;
   a supporting element located under the plate body to support the plate body;
   an adjusting element, wherein when the adjusting element is moved, the supporting element is correspondingly moved, so that the supporting element is contacted with the first fulcrum or the supporting element is contacted with the second fulcrum;

a casing, wherein the switch, the plate body and the supporting element are accommodated within the casing; and an extension part, wherein a first end of the extension part is connected with the plate body, and a second end of the extension part is extended in a direction away from the triggering part and pivotally coupled to the casing, wherein the first fulcrum and the second fulcrum are arranged between the triggering part and the extension part;

wherein while the button is pressed down and the linkage element is moved downwardly toward the triggering part, the triggering part is swung around the first fulcrum or the second fulcrum to push the switch, so that the switch is triggered.

2. The mouse device according to claim 1, wherein the casing further comprises a sliding groove, and the sliding groove is exposed outside the casing, wherein a first end of the adjusting element is connected with the supporting element, and a second end of the adjusting element is movable within the sliding groove.

3. The mouse device according to claim 2, wherein the supporting element comprises an opening, and the first end of the adjusting element has a protrusion structure, wherein after the protrusion structure is penetrated through the opening of the supporting element, the adjusting element is engaged with the supporting element.

4. The mouse device according to claim 1, wherein the casing comprises a top cover, a base and a connecting part, wherein the top cover and the base are combined together, the connecting part is protruded upwardly from the base, and the extension part is pivotally coupled to or fixedly coupled to the connecting part.

5. The mouse device according to claim 1, wherein the extension part is integrally formed with the plate body.

6. The mouse device according to claim 1, wherein the mouse device further comprises a circuit board, and the switch is disposed on the circuit board and electrically connected with the circuit board, wherein when the switch is triggered, the circuit board generates a button signal, wherein the circuit board has a first board hole, and the second end of the extension part is penetrated through the first board hole and pivotally coupled to or fixedly coupled to the casing.

7. The mouse device according to claim 1, wherein the mouse device further comprises a circuit board, and the switch is disposed on the circuit board and electrically connected with the circuit board, wherein when the switch is triggered, the circuit board generates a button signal, wherein the circuit board has a second board hole, and the supporting element is penetrated through the second board hole and movable within the second board hole.

8. The mouse device according to claim 1, wherein a first end of the linkage element is connected with the button, and a second end of the linkage element is extended toward the switch to push the triggering part of the plate body.

9. The mouse device according to claim 8, wherein the casing has an aperture, and the second end of the linkage element is penetrated through the aperture.

* * * * *